United States Patent
Talbot et al.

(10) Patent No.: US 7,917,460 B2
(45) Date of Patent: Mar. 29, 2011

(54) SYSTEMS AND METHODS FOR GENERATING A DECISION NETWORK FROM TEXT

(75) Inventors: Patrick James Talbot, Colorado Springs, CO (US); Dennis Regan Ellis, Colorado Springs, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 268 days.

(21) Appl. No.: 10/881,279

(22) Filed: Jun. 30, 2004

(65) Prior Publication Data

US 2006/0004683 A1    Jan. 5, 2006

(51) Int. Cl.
*G06F 17/00* (2006.01)
*G06N 7/00* (2006.01)
*G06N 7/08* (2006.01)

(52) U.S. Cl. .......................................... 706/59

(58) Field of Classification Search ................ 706/1, 15, 706/45, 59, 53; 700/1, 90; 364/513; 705/37; 707/101
See application file for complete search history.

(56) References Cited

U.S. PATENT DOCUMENTS

| | | | |
|---|---|---|---|
| 4,860,214 A * | 8/1989 | Matsuda et al. ................ 706/52 |
| 5,704,017 A | 12/1997 | Heckerman et al. | |
| 6,334,132 B1 * | 12/2001 | Weeks ........................... 707/101 |
| 2001/0044791 A1 | 11/2001 | Richter et al. | |
| 2002/0103776 A1 | 8/2002 | Bella et al. | |
| 2002/0128816 A1 | 9/2002 | Haug et al. | |
| 2002/0188561 A1 * | 12/2002 | Schultz ........................... 705/40 |
| 2003/0014229 A1 | 1/2003 | Borth et al. | |
| 2003/0018616 A1 | 1/2003 | Wilbanks et al. | |
| 2003/0028469 A1 * | 2/2003 | Bergman et al. ................ 705/37 |

FOREIGN PATENT DOCUMENTS

| | | |
|---|---|---|
| EP | 0 616 288 A2 | 9/1994 |
| WO | WO 01/97164 A2 | 12/2001 |

OTHER PUBLICATIONS

Talbot; 'Computational antiterrorism solutions using a general purpose evidence fusion engine', 2002, Technology review journal. Spring/Summer 2002. pp. 23-36.*

Patrick J. Talbot, "*Semantic Networks: A Unifying Framework for Multistrategy Reasoning*"; Technology Review Journal—Spring/Summer 2003.

\* cited by examiner

*Primary Examiner* — Donald Sparks
*Assistant Examiner* — Peter Coughlan
(74) *Attorney, Agent, or Firm* — Tarolli, Sundheim, Covell & Tummino LLP

(57) ABSTRACT

Systems and methods are provided for generating a decision network from text. An information extraction component extracts a quantum of evidence and an associated confidence value from a given text segment. An evidence classifier associates each quantum of evidence with one of a plurality of hypotheses. A fusion engine builds a decision network from the plurality of hypotheses, an associated base structure, the extracted quanta of evidence, and the confidence values.

18 Claims, 6 Drawing Sheets

SYSTEMS AND METHODS FOR GENERATING A DECISION NETWORK FROM TEXT

TECHNICAL FIELD

The present invention relates to artificial intelligence and, more particularly, to systems and methods for generating a decision network from text.

BACKGROUND OF THE INVENTION

There are different approaches for organizing information content extracted from text, such as decision graphs or data tables, namely, a knowledge-based approach and a data-based approach. Using the knowledge-based approach, a person (known as a knowledge engineer) interviews an expert in a given field to obtain knowledge about the given field. The knowledge engineer and expert first determine the distinctions of the subject matter that are important for decision making in the field of the expert. These distinctions correspond to questions about the variables in the domain of interest, referred to as the hypotheses. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the database approach, the knowledge engineer and the expert first determine the variables of the domain. Next, data is accumulated for those variables, and an algorithm is applied that creates one or more decision graphs from this data. The accumulated data comes from real world instances of the domain or hypothesis. That is, real world instances of decision making in a given field. For some decision-making applications, however, it can be difficult in practice to find sufficient applicable data to construct a viable decision network.

Conventional decision network techniques which combine knowledge-based and data-based approaches include neural networks, Rough Set Theory, and belief networks, such as a Bayesian Belief Network or a Dempster-Shafer Belief Network. Neural networks don't provide robust explanations. Rough sets differentiate between what is certain and what is possible. The Bayesian networks provide intuitive results, but are better suited to causal reasoning. A Dempster-Shafer belief network is an evidential reasoning approach that relies on the Dempster-Shafer Combination Rule, which differentiates ignorance and disbelief (sometimes described as "skeptical" processing), and performs conflict resolution.

Decision makers often find it difficult to mentally combine evidence since the human tendency is to postpone risky decisions when data is incomplete, jump to conclusions, or refuse to consider conflicting data. Those versed in classical (frequentist) statistics realize that in situations where evidence is sparse, the use of a decision network is desirable. Unfortunately, traditional means of generating a decision network are labor intensive, requiring many hours of labor from an analyst knowledgable about the desired application.

SUMMARY OF THE INVENTION

In accordance with one aspect of the present invention, a system is provided for generating a decision network from a plurality of text segments. An information extraction component extracts a quantum of evidence and an associated confidence value from a given text segment. Evidence classifiers associate each quantum of evidence with one or more of a plurality of hypotheses. A fusion engine can build a decision network from the plurality of hypotheses, an associated base structure, the extracted quanta of evidence, and the confidence values.

In accordance with another aspect of the present invention, a computer readable medium having computer executable components is provided for generating a decision network from text. An information extraction component extracts data from a given text segment to generate an associated evidence template within a knowledge base. An evidence classifier assigns a given evidence template to one or more of a plurality of hypotheses. A link analysis component performs a data mining routine within the knowledge base to determine relationships between the plurality of hypotheses according to their associated evidence templates. A fusion engine constructs a decision network from the plurality of hypotheses, their associated evidence templates, the determined relationships between hypotheses, and an associated base structure.

In accordance with yet another aspect of the invention, a method is provided for generating a decision network from a plurality of text segments. Evidence is extracted from each of the plurality of text segments in the form of evidence templates. Each of the evidence templates is assigned into one of a plurality of hypotheses via at least one classification technique. A decision network is generated from the assigned evidence templates and the plurality of hypotheses.

DETAILED DESCRIPTION OF INVENTION

The present invention relates to systems and methods for automating the construction of a decision network from unprepared text. The present invention has broad applicability to risky decision making in circumstances where evidence is uncertain, incomplete, possibly conflicting, and arrives asynchronously over time. In certain aspects of the invention, the decision network is a belief network, such as a Dempster- Shafer belief network. The Dempster-Shafer belief network includes node parameters that conform to the Dempster-Shafer combination rule, which is based on an evidential interval: the sum of a belief value, a disbelief value, and an unknown value is equal to one. The Dempster-Shafer Combination Rule for fusion of evidence provides for nodes in a network represented as evidential intervals with values from the set of real numbers ($0<=n<=1$). Three parameters specify each node: "belief" (B), "unknown" (U) and "disbelief" (D). The unknown parameter is computed as: $U=1-B-D$. The Dempster-Shafer Combination Rule is symmetric, bounded, commutative, and associative.

Figure 1:
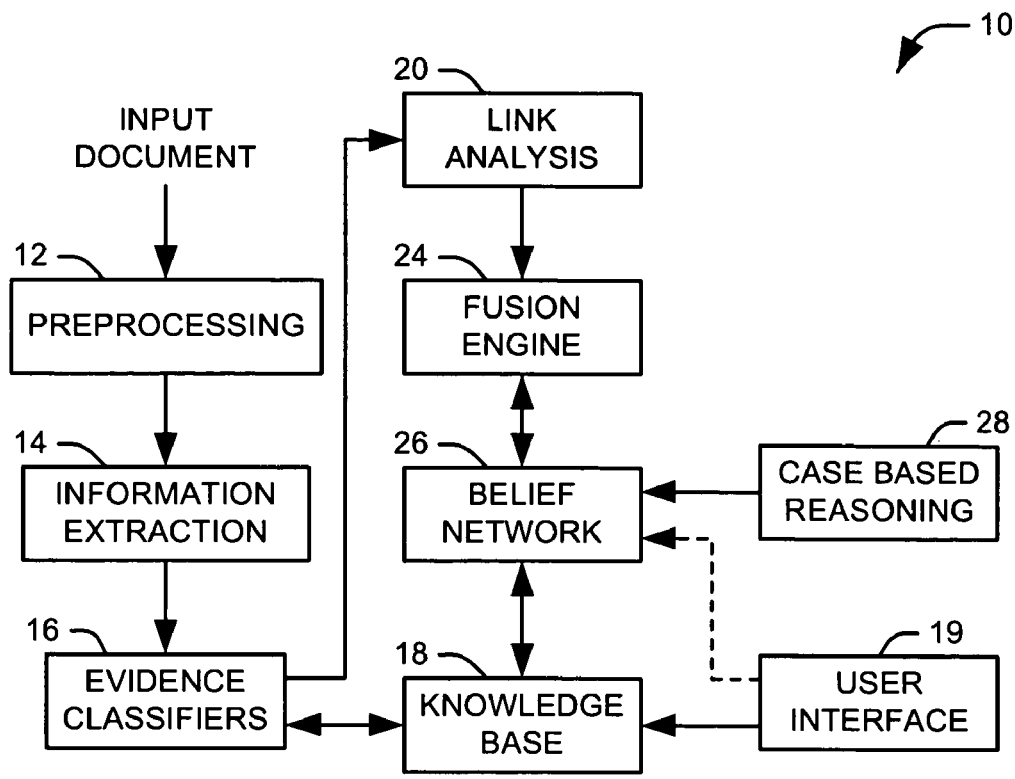
FIG. 1 illustrates a block diagram of a system for constructing a belief network from text inputs in accordance with an aspect of the present invention.

FIG. 1 illustrates a system 10 for constructing a belief network from text inputs. It will be appreciated that the illustrated system 10 can be implemented as one or more computer programs, executable on one or more general purpose computers. Accordingly, any structures herein described can be implemented alternately as dedicated hardware circuitry for the described function or as a program code stored as part of a computer-assessable memory, such as a computer hard drive, random access memory, or a removable disk medium (e.g., magnetic storage media, flash media, CD and DVD media, etc.). Functions carried out by the illustrated system, but not helpful in understanding the claimed invention, are omitted from this diagram. For example, a system implemented as a computer program would require some amount of working memory and routines for accessing this memory. Such matters are understood by those skilled in the art, and they are omitted in the interest of brevity.

The system 10 receives a block of structured, semi-structured, or free text, such as a transcribed conversation, e-mail correspondence record, text report, or knowledge base entry, at a preprocessing component 12. The preprocessing component 12 reduces the input document down to one or more segments of interest via advanced text search techniques and wavelet text processing. Once the segments of interest have been located and isolated from the remaining text, they are provided to an information extraction component 14.

The information extraction component 14 breaks down the text segments into individual words or phrases, interprets the context and meaning of the various words or phrases, and uses the extracted information to fill a domain-specific template representing the text segment. For example, the information extraction component 14 can look for details relating to an event described in the document, such as the nature of the event, the cause or motivation for the event, the mechanism of the event, the identity of an actor, the location of the event, the time or date of the event, and the magnitude of the event. Each of these details can be added to a template related to the text segment. In accordance with one aspect of the invention, the information extraction component 14 can look for hedge words (e.g., maybe, probably, certainly, never) and qualifier words (e.g., not) within the text segment. The information extraction component 14 can use a co-referencing routine to determine what nouns relate to a given hedge or qualifier word, and use this information to determine the weight of the evidence associated with the template, in the form of belief values and disbelief values.

To provide a greatly simplified example, the information extractor 14 might receive a statement from a bank teller that they are certain that Mr. Brown has made a deposit of ten-thousand dollars to a corporate account via a personal check at a bank in downtown Atlanta. The information extraction component would locate the nouns within the sentence as well as words such as "via," "at," and "certain" to determine the relationships between the various nouns and the location of certain information. Thus, the question of location can be answered with the noun or string of nouns following "at" (e.g., bank in downtown Atlanta). The mechanism of the event can be determined by the nouns following "via" (e.g., personal check). The magnitude of the event can be determined by finding the numbers (e.g., ten-thousand), and other details can be provided by classifying the remaining nouns (e.g., Mr. Brown is likely the actor; the event is likely a deposit, etc.). The word "certain," once it is verified that it is referring the deposit, can be used to assign a large belief value to the event.

Once templates have been generated for the text segments, they are provided to one or more evidence classifiers 16. The evidence classifiers 16 assign the templates to associated hypotheses according to their content. It will be appreciated that the evidence classifiers 16 can assign the templates to existing hypotheses in an associated knowledge base 18 or generate a new hypothesis for a given template. The knowledge base 18 can contain hypotheses from previously generated networks, new hypotheses added to accommodate previous templates, and a priori knowledge of the problem added by an analyst through a user interface 19. In an exemplary embodiment, the evidence classifiers 16 can include a rule-based classifier that classifies the templates according to a set of user defined rules. For example, rules can be defined relating to the fields within the template or the source of the data. Other classifiers can include, for example, supervised and unsupervised neural network classifiers, semantic network classifiers, statistical classifiers, and other classifier models. These classifiers can be orchestrated to increase the efficiency of the classification. For example, the rule-based classifier can be applied first, and if a rule is not actuated, the statistical classifier can be used. If a pre-specified probability threshold isn't reached at the statistical classifier, the semantic distance classifier can be applied and the results shown to the user for validation.

Once the templates have been assigned to appropriate hypotheses, the templates are passed to a link analysis component 20. The link analysis component 20 determines the relatedness of two hypotheses according to relationships in the evidence associated with the templates. One factor utilized by the link analysis component 20 is the co-occurrence of various key words and phrases in the evidence templates assigned to two hypotheses. The frequency of co-occurrence of evidence among the various hypotheses can be used to calculate initial strength values, or weights, to the links between hypotheses. Link strength indicates the degree of influence a given hypothesis and its associated belief and disbelief values have on a linked hypothesis.

The link strengths and hypotheses are then provided to a fusion engine 24. The fusion engine 24 arranges the hypotheses according to a predefined structure to establish a hierarchy among the hypotheses. For example, the predefined structure can include a number of categories, representing layers within the hierarchy, with the proper category for a given hypothesis being determined when it is entered into the knowledge base 18. Once the hypotheses have been categorized, they can be linked according to the determined link strengths to form a preliminary network. This preliminary network can be reviewed by a human analyst to ensure that the hypotheses are organized and linked correctly.

Once the preliminary network is established, the fusion engine 24 can mathematically reconcile the estimated belief and disbelief values for the various hypotheses according to their associated linkages and an associated fusion algorithm. For example, the belief values for each hypothesis can be determined for a bottom row of the hierarchy, and the resulting belief values can be propagated up through the belief network. The resulting belief network 26 can be used to make decisions related to its constituent hypothesis. The fusion engine 24 further comprises mechanisms for fusing new evidence and new nodes into the belief network 26. The fusion engine 24 can also include an analyst override function that allows the analyst to modify beliefs and disbeliefs of one or more hypotheses within the belief network 28. A back propagation routine associated with the fusion engine 24 then propagates the modifications at one or more nodes of a selected layer backward through the network to iteratively modify upper layers to facilitate the mathematical correctness of the belief network 28. Link values can also be modified to facilitate mathematical correctness.

Once the belief network 28 is completed, new evidence can be added through the same process, with the new evidence being incorporated by the fusion engine 24. For an exemplary network, the new evidence can include belief (b), disbelief (d), and unknown (u) values for an associated hypothesis. The new evidence of belief (b), disbelief (d) and unknown (u) can then be fused with the current Belief (B), Disbelief (D), and Unknown (U) for the associated hypothesis to provide new modified parameters. The new parameters evidence is fused by a fusion algorithm according to the Dempster-Shafer combination rule. The updated node parameters are then propagated to nodes in lower layers of the belief network 28 by the fusion engine. In an exemplary embodiment, the fusion algorithm includes evaluating a Cartesian product of the new evidence with the current evidence to provide newly updated evidence. The Cartesian product is used in the following equations:

$$MB=(bB+bU+uB)/N \quad \text{EQ. 1}$$

$$MD=(dD+dU+uD)/N \quad \text{EQ. 2}$$

$$N=1-dB-bD \quad \text{EQ. 3}$$

where MB is the modified belief, MD is the modified disbelief and N is the normalization equation that represents conflicting evidence that is normalized out of the modified belief and modified disbelief. Other fusion algorithms in use include a weighted averaging of evidence (e.g., to combine expert opinions), Bayes Rule, and fuzzy logic (often combines evidence by choosing the pessimistic value).

The parameters of the belief network can also be altered by an analyst through the user interface 19. The analyst can input new values for a given hypothesis, and the fusion engine 24 can propagate the effects of the new values throughout the network as described above. Other updates to the network can be provided through a case-based reasoning component 28. The case-based reasoning component 28 includes a knowledge base, organized as a semantic network, containing plurality of successful networks. When certain selection criteria for each network are met by the belief network 24, hypotheses and parameters from the stored networks can be implemented into the existing belief network 24 as new belief network fragments. For example, when a series of evidence templates that are not associated with a known hypothesis are inputted to the system 10, the knowledge base associated with the case-based reasoning component 28 can be searched to determine if similar evidence can be found within a stored network. If so, one or more hypotheses from the stored network can be adopted (e.g., by computing the union of the belief network and the hypotheses) into the belief network 26.

Figure 2:
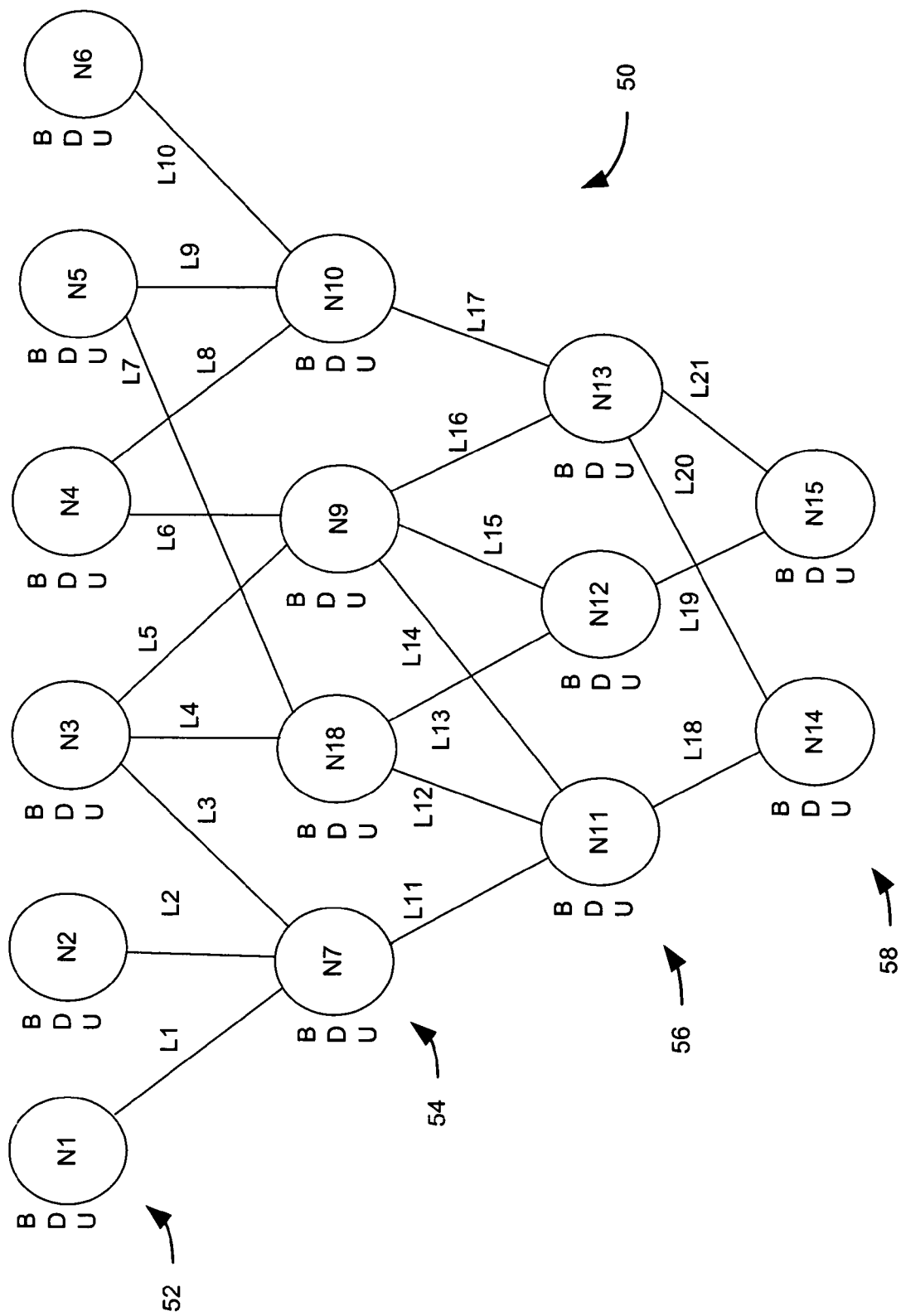
FIG. 2 illustrates a representation of a belief network in accordance with an aspect of the present invention.

FIG. 2 illustrates a representation of a decision network 50 in accordance with an aspect of the present invention. The decision network 50 of FIG. 2 is illustrated as a Dempster-Shafer belief network, but it will be appreciated that other decision networks, such as Artificial Neural Networks, Decision Trees, Bayesian belief networks and Markov networks, can be constructed from text in accordance with the present invention. The decision network 50 includes a top layer 52, a first intermediate layer 54, a second intermediate layer 56, and a bottom layer 58. The top layer 52 includes nodes N1-N6 linked to the first intermediate or hypothesis layer 54 by links or multipliers L1-L10. The first intermediate layer 54 includes nodes N7-N10 linked to the second intermediate layer 54 by links or multipliers L11-L17. The second intermediate layer 56 includes nodes N1-N13 linked to the bottom layer 58 by links or multipliers L18-L21. Each node represents a given variable and hypothesis associated with that variable that can affect the variable and hypothesis of other nodes in lower layers mathematically. Associated with each of the nodes N1-N15 are three parameters, which are a belief parameter B, a disbelief parameter D, and an unknown parameter U. The parameters B, D, and U conform to the Dempster-Shafer evidential interval such that the parameter B, D and U add up to one for each node N1-N15.

The links represent multipliers or weights of a given parameter on a lower node. Link values can be constant, or computed by an algorithm. For example, the belief of node N7 of the first intermediate layer 54 depends on the belief of nodes N1, N2, and N3, each multiplied by its respective link value L1, L2, and L3. Additionally, the disbelief of node N7 of the first intermediate layer 54 depends on the disbelief of nodes N1, N2, and N3, each multiplied by its respective link value L1, L2, and L3. The unknown is computed based on the Dempster-Shafer combination rule. The belief and disbelief of node N7 then propagate to N11 through link L11, which is combined with the belief and disbelief of N18 multiplied by link L12 and the belief and disbelief of node N9 multiplied by link L14. The belief and disbelief of node N11 then propagate to node N14 through link L18 which is combined with the belief and disbelief of N13 multiplied by link L20. The unknowns of each row can be evaluated using the Dempster-Shafer combination rule. Similar propagation occurs to provide the beliefs, the disbeliefs, and unknowns of the node N15.

Figure 3:
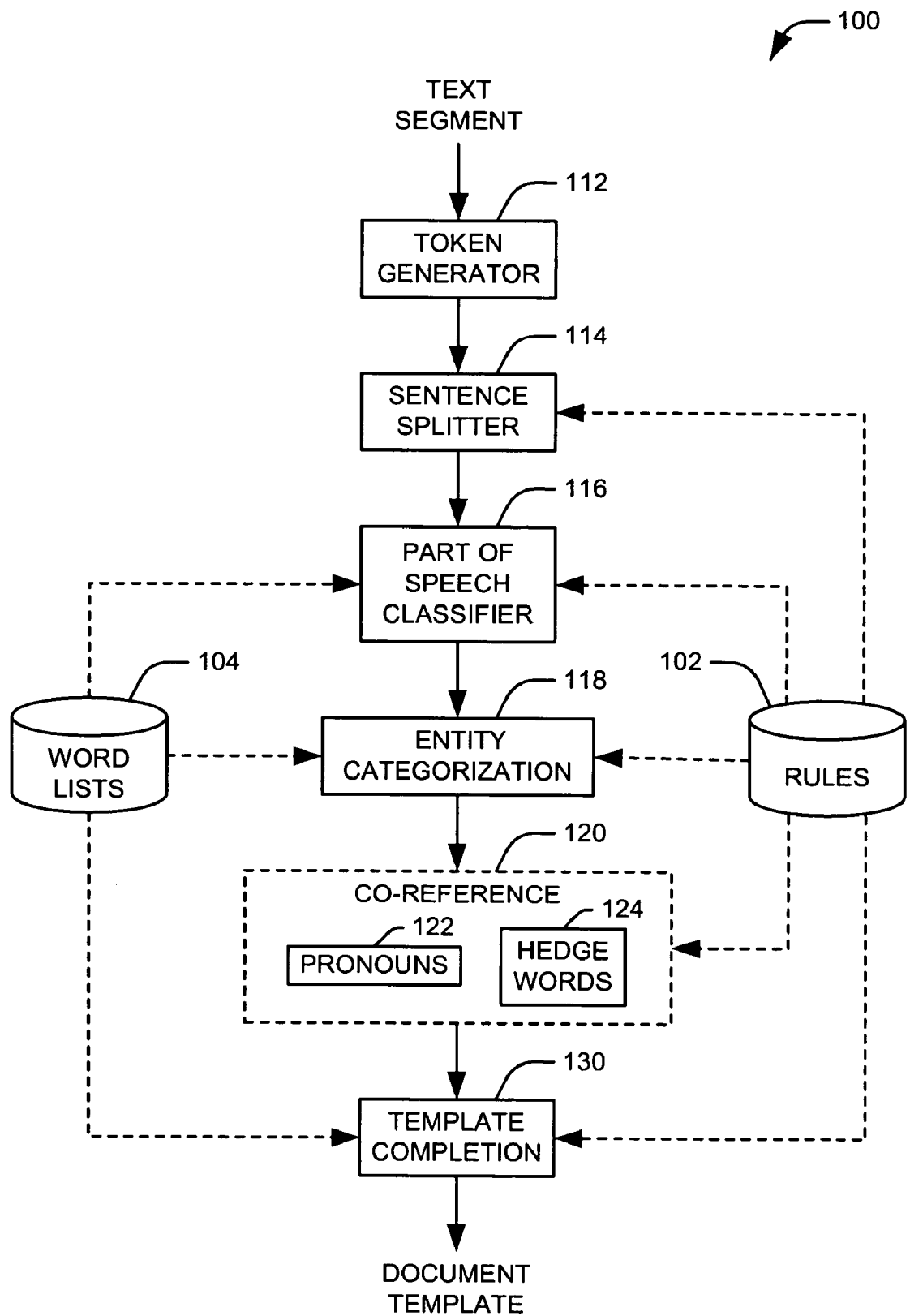
FIG. 3 illustrates a block diagram of an exemplary information extraction component in accordance with an aspect of the present invention.

FIG. 3 illustrates an exemplary information extraction component 100 in accordance with an aspect of the present invention. It will be appreciated that the text segment can comprise a portion of a digital text document formatted to be readable by a computer. For example, a given text segment can be part of a document generated in digital form (e.g., an e-mail message), part of a document scanned into digital text by known optical character recognition techniques, or a portion of a digital voice conversation represented as digital data (e.g., by voice over Internet Protocol (VoIP)). The information extraction component 100 extracts desired information from a digital text segment according to a set of extraction rules 102 and a number of word lists 104, each containing words commonly of interest at a given stage in the extraction process.

In the illustrated example, the information extraction component 100 attempts to extract information from the document as to answer detailed questions derived from the so-called "Reporter's Questions" (e.g., who, what, when, where, how, why, and how much). Accordingly, the information extraction component 100 attempts to locate a subject and an event for a given text segment, as well as the location, magnitude, timing, cause, and mechanism of the event, and output this data as an evidence template. In accordance with an aspect of the present invention, the information extraction component 100 further determines a confidence value for the evidence template according to empirically determined psychological weights associated to one or more hedge words (e.g., probably, possibly, certainly) found within the text segment. In an exemplary embodiment, the information extraction component can comprise the General Architecture for Text Engineering system developed by the University of Sheffield along with a number of customized modules for template filling and hedge word co-reference and interpretation.

A text segment is provided to a token generator 112. The token generator 112 differentiates between the individual words and the spaces within the text to identify its constituent words. The text segment is then provided to a sentence splitter 114. The sentence splitter 114 divides the text into individual sentences according to an associated subset of the extraction rules 102. The sentence splitter 114 is able to distinguish capitalization and punctuation associated with abbreviations and proper nouns from that associated with individual sentences to provide an accurate parsing of the sentences within the text segment. Once the individual sentences within the text segment have been identified, the text segment is passed to a part of speech classifier 116. The part-of-speech classifier 116 determines an associated part-of-speech for each word according to an associated word list and an associated subset of the extraction rules 102. The part-of-speech classifier 116 determines the part-of-speech (e.g., noun, verb, pronoun) of each word within a given sentence according to its normal usage and the context of the surrounding words.

The text segment is then provided to an entity categorizer 118 that associates a specific word with a general category. For example, the entity categorizer 118 can sort words into categories representing people, locations, organizations, time, and similar concepts. The entity categorizer uses word lists and rules to define what words go in which categories. The categorized words are then provided to a co-reference component 120. The co-reference component 120 associates certain words within a text segment with other logically related words. In the illustrated example, the co-reference component 120 contains a pronoun module 122 and a hedge word module 124. The pronoun module 122 identifies pronouns within the text segment and links them to their appropriate antecedents according to an associated subset of the extraction rules 102.

The hedge word module 124 locates hedge words in the document, hedge words being words that people use within a text to emphasize their degree of belief or disbelief in a particular fact. Each hedge word is assigned a confidence value, indicating the degree of belief or disbelief generally conveyed by the word within a given text. In an exemplary embodiment, the confidence values are determined according to psychological studies on the confidence conveyed by various hedge words within a text passage as perceived by a reader. The hedge word module 124 co-references a given hedge word to a particular fact within the text segment and determine a confidence value associated with that fact. From the confidence values associated with various portions of the text segment, initial belief and disbelief values can be calculated for the evidence provided by the text segment. Where no hedge words are available in a document, default belief and disbelief values can be assigned to the evidence. In an exemplary embodiment, the default values for both belief and disbelief are zero. The initial belief and disbelief values for a given piece of evidence can be reviewed and revised by a human analyst through a user interface (not shown) associated with the information extraction system.

TABLE 1

Exemplary Hedge Words with Associated Confidence values

| Absolutely | 1 | Actively | 0.78 | Actually | 0.76 | Admittedly | 0.89 | Almost | 0.83 |
|---|---|---|---|---|---|---|---|---|---|
| Apparently | 0.93 | Certainly | 1 | Characteristically | 0.88 | Already | 0.97 | Conceivably | 0.78 |
| Conceptually | 0.75 | Hardly | 0.23 | Hopefully | 0.43 | Clearly | 1 | Conceptually | 0.75 |
| Eventually | 0.89 | Inevitably | 0.67 | Might | 0.52 | Ideally | 0.5 | Impossible | 0 |
| Likely | 0.72 | Maybe | 0.54 | Perhaps | 0.4 | Normally | 0.67 | Occasionally | 0.51 |
| Possibly | 0.6 | Predictably | 0.7 | Presumably | 0.45 | Probably | 0.55 | Rarely | 0.23 |
| Supposedly | 0.64 | Theoretically | 0.48 | Unlikely | 0.03 | Strongly | 0.98 | | |

The template completion component 130 utilizes the results of the other components to fill a plurality of template fields according to one or more associated word lists and an associated subset of the extraction rules 102. It utilizes the entity categorizations to search for a more detailed description of the tagged words from other results of the information extraction component 100 according to its associated rules. Then the module uses the word list to find and tag other words that may fit a particular field according to its defined rules. Once it is done tagging the words, the template completion component 130 goes through the text and retrieves the words in the order defined by the template and formats the output to form an at least partially completed evidence template. It will be appreciated that a text segment may not provide all the evidence characteristics defined in the detailed Reporter's Questions evidence template, which comprises more than fifty subfields in some implementations.

Figure 4:
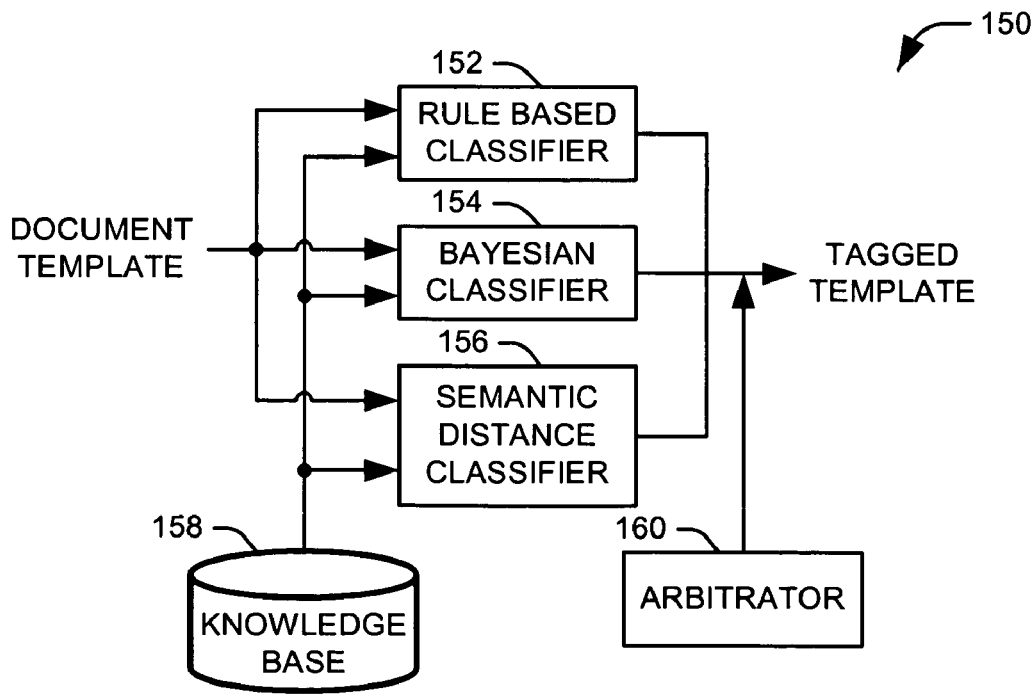
FIG. 4 illustrates a block diagram of an exemplary evidence classifier in accordance with an aspect of the present invention.

FIG. 4 illustrates an exemplary evidence classifier 150 in accordance with an aspect of the present invention. The illustrated evidence classifier 150 includes three classifiers 152, 154, and 156 that attempt to classify a template into one of a plurality of hypotheses associated with a knowledge base 158. One or more of the classifiers can be capable of unsupervised classification as to allow the proposal of new hypotheses for the knowledge base 158. A final output can be selected from the classifiers by an arbitrator 160. The arbitrator 160 can include an automated system for selecting among the outputs of the three classifiers according to associated output scores. Appropriate systems for this task are known in the art. In the illustrated example, the arbitrator 160 includes a user interface that allows a human analyst to review the outputs of the three classifiers and determine an appropriate classification from their output. It will be appreciated that the user interface can be used in combination with automated systems to allow a human analyst to review only those classifications which do not meet predetermined standards for agreement among the classifiers or a threshold output score.

In the illustrated example, the knowledge base 158 comprises a weighted graph that hierarchically represents relationships between hypotheses. Each node in the graph represents a specific hypothesis. The weighted links between hypotheses in the graph represent logical relationships between the hypotheses and the strength of their interrelationship. Accordingly, the knowledge base 158 of the illustrated example comprises a plurality of hypotheses arranged in a hierarchical fashion, representing the correlations between the hypotheses. The representation of complete hypotheses instead of simple words allows for the representation of more information than a traditional ontology arrangement. This adds to the complexity of the hierarchy, requiring a significant departure from traditional structures. For example, in an exemplary knowledge base 158, each hypothesis can have multiple parent hypotheses (a lattice structure), as opposed to the at most one parent used in traditional structures.

A rule-based classifier 152 includes a plurality of user-defined directives, comprising simple if-then statements. If a document template contains a certain word or phrase in a desired field, it is associated with the hypothesis indicated by the rule. The association can be automated, or the template can simply be tagged for review by a human analyst. For example, a user can create a rule that dictates that the document pertains to a network scan if the key phrase "scan log" is found in a source field of the template. Where the arbitrator 160 is a fully automated system, the rule-base classifier can be used before the other classifiers 154 and 156 to filter out and classify text segments that have an obvious relationship to a given hypothesis. This produces a significant savings in processing resource. Where the classifications are arbitrated by a human analyst, the tagging of the templates highlights characteristics of interest within the template, allowing the analyst to quickly evaluate the relevant portions. A Bayesian classifier 154 can be used to probabilistically specify multiple hypotheses for the template according to historical training data. This training data can be provided by previously classified templates or co-occurrence matrices stored in the knowledge base. In an exemplary embodiment, the Bayesian classifier 154 comprises an Autoclass naïve Bayesian classifier tool.

A semantic distance classifier 156 employs two semantic distance algorithms to determine average (semantic mean) and modal (semantic mode) hypotheses within the knowledge base hierarchy. Each hypothesis in the knowledge base can have an associated set of key words and key phrases. The number of keyword "hits" within the template can be determined for each hypothesis. A semantic mean algorithm then determines an average hypothesis in a document by determining the hypothesis having the minimum sum of the distance, in terms of the weighted links, to all hits among the hypotheses. Since the hypotheses are logically related, the determined center of the distribution of hits should provide the central concept of the text segment Outlying hits can be ignored to prevent skewing of the results. The semantic mode can be determined as the hypothesis with the largest number of hits. As the hypothesis having the most support within the template, it is an obvious candidate for a hypothesis. Where the semantic mean and the semantic mode differ, both hypotheses can be provided to the arbitrator 160.

Figure 5:
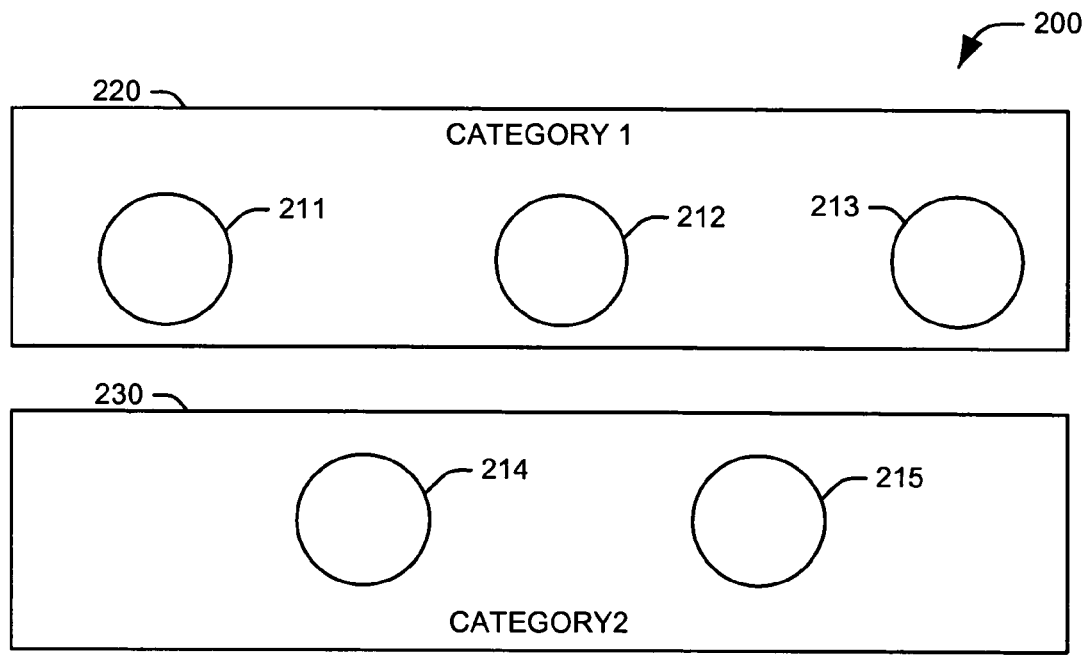
FIG. 5 illustrates a first stage in the construction of a decision network in accordance with an aspect of the present invention.
Figure 6:
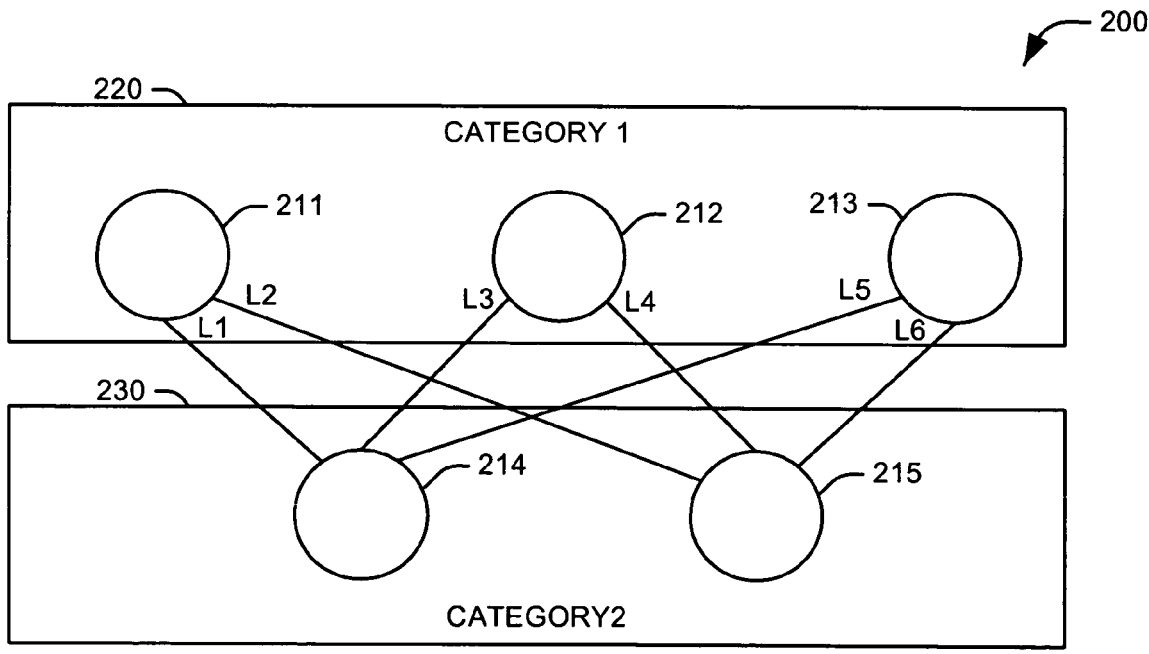
FIG. 6 illustrates a second stage in the construction of a decision network in accordance with an aspect of the present invention.
Figure 7:
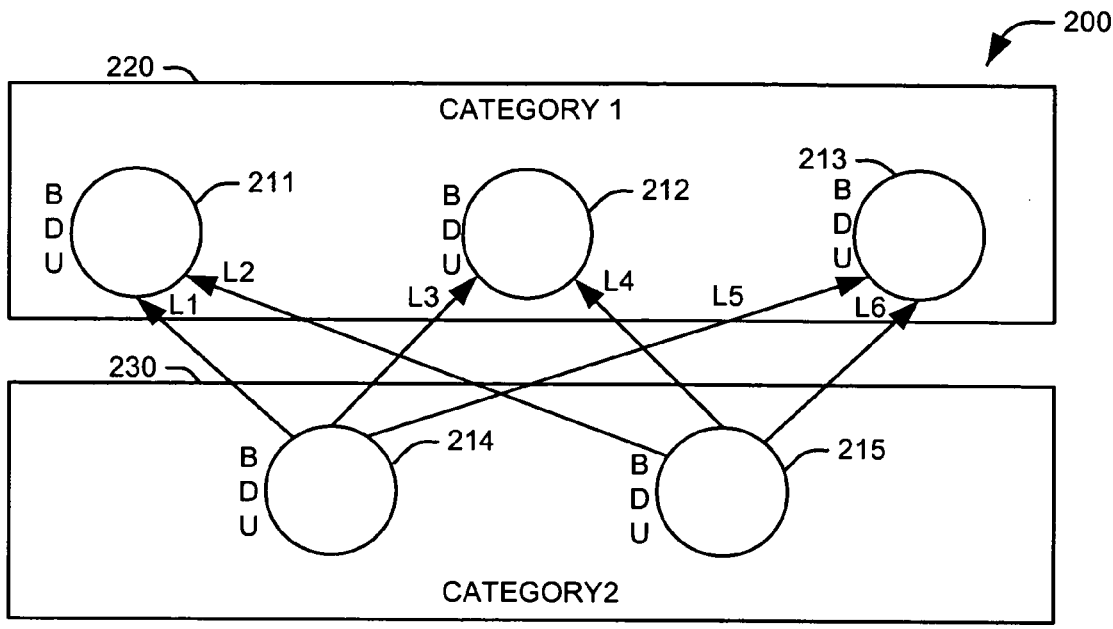
FIG. 7 illustrates a third stage in the construction of a decision network in accordance with an aspect of the present invention.

FIGS. 5-7 illustrate respective steps in the construction of a decision network 200 containing five hypotheses 211-215 generated in response to evidence extracted from one or more text segments. FIG. 5 illustrates the arrangement of the five hypotheses into a hierarchical structure comprising two categories 220 and 230. The categories are defined as to place the hypotheses into a logical ordering, such that hypotheses in one category are logically supported by hypotheses in a second category lower in the hierarchy. The hierarchical structure and the membership of the hypotheses in each category can be determined by a human analyst prior to the creation of the decision network. New hypotheses can be classified into categories by the analyst or via an automated system that determines an appropriate category for a hypothesis according to its relationship to other hypotheses, as determined by link analysis. It will be appreciated that a practical system will generally have more than two categories of hypotheses. In an exemplary security application, six categories can be used ranging from hypotheses representing overarching strategic objectives at a highest category, to raw evidence supporting these objectives in a lowest category.

FIG. 6 illustrates the linking of the five hypotheses 211-215 across categories via a plurality of weighted links L1-L6 according to a link analysis process. In the illustrated example, the weight for each link is determined according to a data mining algorithm that determines co-occurrence of concepts across evidence extracted from text segments for a given parent node and an associated child node. The specific search terms can be widened to more general concepts through the use of a lexical database, such as WordNet. The lexical database creates and stores sets of words that are contextually synonymous, allowing the data mining algorithm to broaden the search for a specific term. From this data, the link analysis routine can determine to what degree evidence for a given child hypothesis is similar to other evidence for the parent node (e.g., evidence for its other associated child nodes). A close relationship between the child node's evidence and the evidence for the other child nodes of a given parent node indicates a strong association between the parent and child nodes, and a correspondingly large link weight can be assigned.

FIG. 7 illustrates the calculation of belief, disbelief, and unknown values for the hypotheses 211-215 by a fusion engine according to a fusion algorithm. In an exemplary embodiment, the evidence for each hypothesis is extracted from a plurality of text segments and combined via an associated fusion algorithm to produce belief and disbelief values for a first category of hypotheses. Once these values have been calculated, they are propagated forward to the next layer of hypotheses via the weighted links. Each of these hypotheses receives the weighted belief values from its associated child hypotheses and combines them its own associated evidence to determine belief, disbelief, and unknown values. This continues until the values at the top of the tree are reached. Once the values have been calculated, the decision network can be used for later decision making via a user interface.

Figure 8:
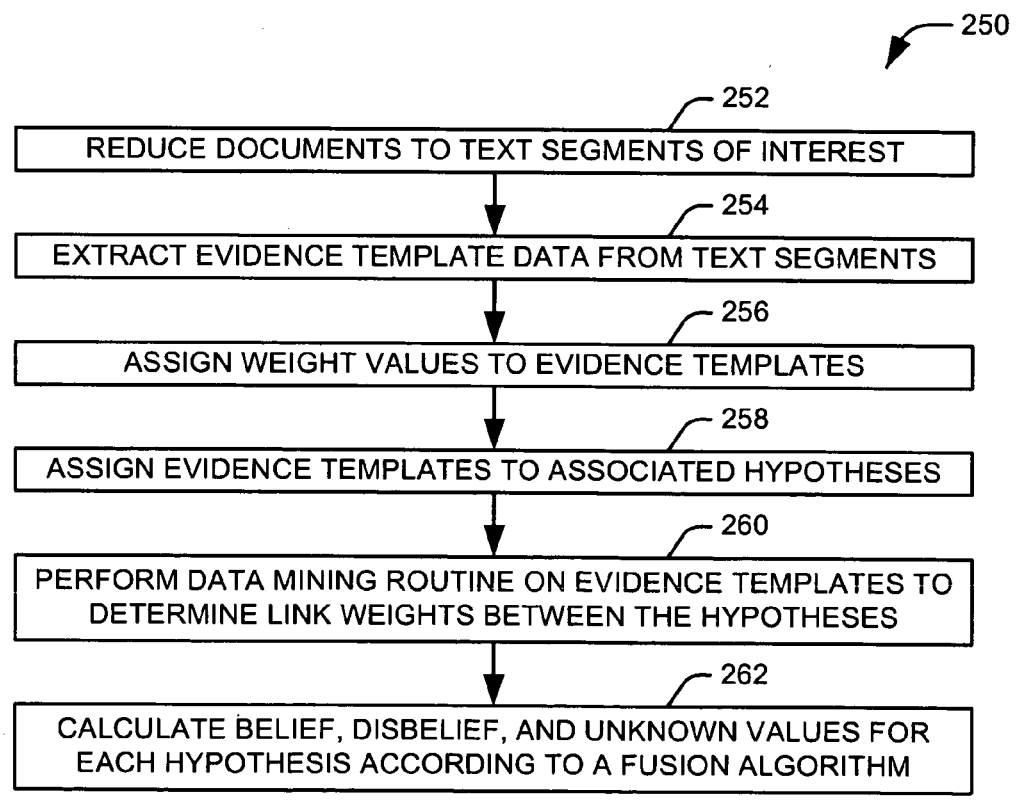
FIG. 8 illustrates a methodology for constructing a decision network from a plurality of text documents in accordance with an aspect of the present invention.

In view of the foregoing structural and functional features described above, methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates a methodology 250 for constructing a decision network from a plurality of structured text, free text, or semi-structured text. The text can include transcribed conversations, e-mail correspondence, text reports, or database entries. The methodology 250 begins at 252, where the text is reduced to relatively short text segments of interest. In generating the text segments, the portions of the text having the largest density of information can be identified and isolated from the remainder of the text via advanced text search techniques and wavelet text processing. The methodology then advances to 254, where desired information is extracted from the text segments via an information extraction routine. The information extraction routine divides the image into individual words and determines their associated part of speech according to their context within the sentence. The nouns within the text can be classified into general categories according to a set of rules and word lists, and associated with various pronouns and hedge words. A template can then be generated from this data including answers to the detailed "Reporter's Questions" (e.g., who [who is the friend, who is the foe, who is the scribe], what, where [continent, nation, city, latitude, longitude, altitude], when, how, and why).

At 256, confidence values are determined for each evidence template, reflecting an approximate degree of confidence expressed in the text segment. One or more confidence values can be assigned to each template as determined from the various identified hedge words. These assigned confidence values can be used to determine initial belief, disbelief, and unknown values associated with the evidence. At 258, the templates are assigned to associated hypotheses by one or more evidence classifiers, each employing an associated classification technique. The evidence classifiers determine an appropriate hypothesis for the template from a plurality of available hypotheses in an associated knowledge base. If no suitable hypothesis is found, the template can be assigned to a new or existing hypothesis by a human analyst.

Once all of the templates have been assigned to associated nodes, a data mining routine, for example, link analysis, can be applied to the templates at 260. The data mining routine can determine the strength of association between two hypotheses according to the overlap in the evidence supporting them. For example, where similar evidence is found supporting two different hypotheses, an association between the hypotheses can be inferred. Once the initial hypotheses, evidence belief values, and link strengths have been determined from the textual evidence, a preliminary structure for the decision network has been defined. The methodology then advances to 262. At 262, a fusion engine associated with the system calculates appropriate belief, disbelief, and uncertainty values for each hypothesis according to the determined belief and link strength values and an associated data fusion algorithm. Once the belief, disbelief, and unknown values for each hypothesis have been determined, the decision network is complete and can be utilized by an analyst in a decision making process.

After a decision network is constructed, the system can continue to integrate new pieces of evidence into the network via the data fusion algorithm. A new text segment can be processed by the system to create a document template from information extracted from the segment. As discussed above, the extracted information can provide a starting probability associated with the document template. The document template is then classified at one or more classifiers to determine a hypothesis associated with the template and its associated place within the network structure. It will be appreciated that the template can be associated with a new or existing hypothesis. If the hypothesis is a new hypothesis, its connection to the existing hypotheses can be determined via a link analysis procedure, as described above. The new evidence is then placed into the network, and new values are calculated for each hypothesis in light of the new evidence.

Figure 9:
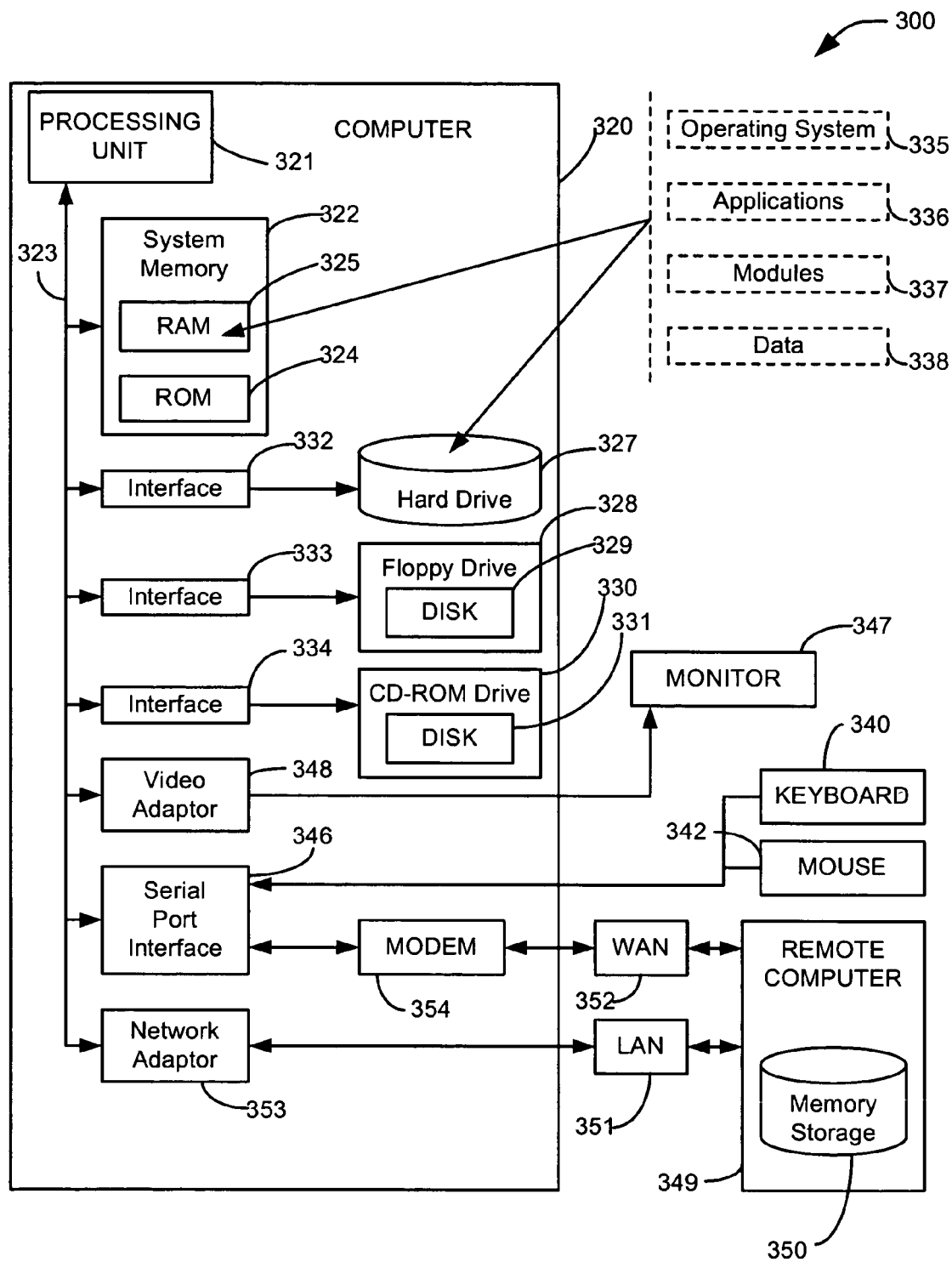
FIG. 9 illustrates a schematic block diagram of an exemplary operating environment for a system configured in accordance with an aspect of the present invention.

With reference to FIG. 9, an exemplary system for implementing the various aspects of the invention includes a conventional server computer 320, including a processing unit 321, a system memory 322, and a system bus 323 that couples various system components including the system memory to the processing unit 321. The processing unit may be any of various commercially available processors. Dual microprocessors and other multi-processor architectures also can be used as the processing unit 321. The system bus may be any of several types of bus structure including a memory bus or memory controller, a peripheral bus, and a local bus using any of a variety of conventional bus architectures. The system memory includes read only memory (ROM) 324 and random access memory (RAM) 325. A basic input/output system (BIOS), containing the basic routines that help to transfer information between elements within the server computer 320, such as during start-up, is stored in ROM 324.

The server computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the server computer 320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 325, including an operating system 335, one or more application programs 336, other program modules 337, and program data 338. A user may enter commands and information into the server computer 320 through a keyboard 340 and a pointing device, such as a mouse 342. Other input devices (not shown) may include a microphone, a joystick, a game pad, a satellite dish, a scanner, or the like. These and other input devices are often connected to the processing unit 321 through a serial port interface 346 that is coupled to the system bus, but may be connected by other interfaces, such as a parallel port, a game port or a universal serial bus (USB). A monitor 347 or other type of display device is also connected to the system bus 323 via an interface, such as a video adapter 348. In addition to the monitor, computers typically include other peripheral output devices (not shown), such as speakers and printers.

The server computer 320 may operate in a networked environment using logical connections to one or more remote computers, such as a remote client computer 349. The remote computer 349 may be a workstation, a server computer, a router, a peer device or other common network node, and typically includes many or all of the elements described relative to the server computer 320, although only a memory storage device 350 is illustrated in FIG. 9. The logical connections depicted in FIG. 9 include a local area network (LAN) 351 and a wide area network (WAN) 352. Such networking environments are commonplace in offices, enterprise-wide computer networks, intranets and the Internet.

When used in a LAN networking environment, the server computer 320 is connected to the local network 351 through a network interface or adapter 353. When used in a WAN networking environment, the server computer 320 typically includes a modem 354, or is connected to a communications server on the LAN, or has other means for establishing communications over the wide area network 352, such as the Internet. The modem 354, which may be internal or external, is connected to the system bus 323 via the serial port interface 346. In a networked environment, program modules depicted relative to the server computer 320, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 320, unless otherwise indicated. Such acts and operations are sometimes referred to as being computer-executed. It will be appreciated that the acts and symbolically represented operations include the manipulation by the processing unit 321 of electrical signals representing data bits which causes a resulting transformation or reduction of the electrical signal representation, and the maintenance of data bits at memory locations in the memory system (including the system memory 322, hard drive 327, floppy disks 329, and CD-ROM 331) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, while a number of examples herein have discussed the construction of Dempster-Shafer belief networks, it will be appreciated that other decision networks, such as Bayesian belief networks and Markov networks, can be constructed from text in accordance with the present invention. Accordingly, the present invention is intended to embrace all such alterations, modifications, and variations that fall within the spirit and scope of the appended claims.

What is claimed is:

1. A system for generating a decision network from a plurality of computer readable text documents, the system comprising:
    memory that stores a plurality of computer readable text documents; and
    a processing unit for accessing the memory and for executing computer executable instructions, the computer executable instructions comprising:
        a preprocessing portion configured to reduce a given computer readable text document of the plurality of computer readable text documents into one or more text segments;
        an information extractor configured to:
            identify predefined hedge words and predefined qualifier words in the one or more text segments relating to one or more words in the one or more text segments, wherein the one or more words comprise at least one of a noun, a pronoun and a verb; and
            assign a confidence value to each identified hedge word and qualifying word that represent a degree of belief or disbelief for the related one or more words;
        an evidence classifier configured to associate each of the one or more text segments with one of a plurality of hypotheses;
        a fusion engine configured to build a decision network from the plurality of hypotheses that define nodes in the decision network, an associated predefined hierarchical structure for the decision network, the identified hedge words and qualifying words, their related one or more words, and the assigned confidence values;
        a knowledge base that stores information relating to the plurality of hypotheses, the evidence classifier being operative to add a new hypothesis to the knowledge base in response to identification of hedge words and qualifier words in the one or more text segments; and
        a user interface that displays the generated decision network to a user.

2. The system of claim 1, further comprising a link analysis component configured to determine link confidence values for the plurality of hypotheses from their associated hedge words for each of the one or more text segments, the fusion engine being configured to utilize the link confidence values in assembling the decision network.

3. The system of claim 1, further comprising a scanner configured to convert paper documents into text, wherein the given computer readable text document of the plurality of computer readable text documents is an optical character recognition conversion of a paper document.

4. The system of claim 1, further comprising a case based reasoning component configured to update the decision network based on previous successful decision networks stored in an associated knowledge base.

5. The system of claim 1, the knowledge base comprising a weighted graph wherein each of the plurality of hypotheses are represented by a node within the graph, and the nodes are connected by weighted links representing logical relationships between the hypotheses.

6. The system of claim 5, the plurality of hypotheses having respective associated sets of key words, and the evidence classifier including a semantic distance classifier that matches words within the one or more text segments to the respective sets of key words associated with the plurality of hypotheses, the semantic classifier determining a hypothesis for the one or more text segments according to a distribution of the words in the one or more text segments among the respective sets of key words associated with the plurality of hypotheses.

7. The system of claim 6, wherein the occurrence of a key word from a set of key words associated with a given hypothesis within the one or more text segments represents a point associated with that hypothesis on the weighted graph, the selected hypothesis being selected as a weighted mean position of a plurality of points.

8. The system of claim 6, wherein the selected hypothesis is the hypothesis having a largest number of occurrences of key words from its associated set of key words within the one or more text segments.

9. The system of claim 1, wherein the confidence values are assigned according to a set of predefined confidence values, the predefined confidence values are based on a representation of human perception of the confidence expressed by each of a plurality of recognized hedge words and qualifying words.

10. The system of claim 1, the decision network being a Dempster-Shafer belief network.

11. The system of claim 1, the user interface being operative to allow a user to modify node parameters within the decision network, the fusion engine back propagating the modified node parameters through the decision network.

12. A computer readable medium, having computer executable components, for generating a decision network from text, the computer readable medium comprising:
- a preprocessing component that retrieves a computer readable text document from a memory and produces at least one text segment based on the computer readable text document;
- an information extraction component that identifies hedge words and qualifying words in the at least one text segment relating to one or more words in the at least one text segment, the one or more words comprising at least one of a noun, a pronoun and a verb in the at least one text segment, the information extraction component assigning confidence values to each of the identified hedge words and qualifying words representing a degree of belief or disbelief for the related one or more words to generate an associated evidence template within a knowledge base;
- an evidence classifier that assigns a given evidence template to one of a plurality of hypotheses;
- a link analysis component configured to execute a data mining routine within the knowledge base to determine relationships between the plurality of hypotheses according to their associated evidence templates;
- a fusion engine that constructs a decision network from the plurality of hypotheses that define nodes in the decision network, their associated evidence templates, the determined relationships between hypotheses, and an associated predefined hierarchical base structure of the hypotheses represented as nodes in the decision network;
- a knowledge base that stores information relating to the plurality of hypotheses, the evidence classifier being operative to add a new hypothesis to the knowledge base in response to identification of hedge words and qualifying words in the one or more text segments; and
- a user interface that displays the constructed decision network to a user.

13. The computer readable medium of claim 12, wherein a given evidence template has a plurality of fields, and the evidence classifier comprising a rule-based classifier that classifies the evidence template according to the presence of key words in at least one field of interest among the plurality of fields.

14. The computer readable medium of claim 12, wherein the computer readable text document comprises one of an e-mail message, an optical character recognition conversion of a paper document, a text report and a transcribed conversation.

15. The computer readable medium of claim 12, wherein the link analysis identifies a co-occurrence of key words and phrases in each of the associated evidence templates to determine initial strength values and/or weights of links between the plurality of hypotheses.

16. A method for generating a decision network from a plurality of computer readable text documents, comprising:
- retrieving a given computer readable text document of the plurality of computer readable text documents from a memory of a computer system;
- reducing the given computer readable text document of the plurality of computer readable text documents into one or more text segments, the one or more text segments being stored in the memory;
- forming an evidence template in the memory for each of the one or more text segments, the forming comprising:
  - identifying hedge words and qualifying words in the at least one text segment that relate to one or more words in the text segment, the one or more words comprising at least one of a noun, a pronoun and a verb; and
  - assigning a confidence value to each identified hedge word and qualifying word in the at least one text segment, wherein each confidence value represents a degree of belief or disbelief for the one or more words related to each identified hedge word and qualifying word; and
- assigning each evidence template in the memory to one of a plurality of hypotheses stored in the memory by employing at least one classification technique, wherein each of the hypotheses are configured to define nodes in a given decision network
- generating a decision network from each evidence template and the plurality of hypotheses, such that each of the plurality hypotheses represent nodes in the decision network, wherein the decision network is stored in the memory;
- adding an additional hypothesis to the decision network that represents an additional node of the decision network, the additional hypothesis being associated with a previously generated decision network; and
- displaying the generated decision network to a user.

17. The method of claim 16, further comprising scanning a paper document to form the given computer readable text document of the plurality of computer readable text documents, such that the given computer readable text document of the plurality of computer readable text documents is an optical character recognition conversion of the paper document.

18. The method of claim 16, further comprising data mining the assigned evidence templates to determine link values associated with the plurality of hypotheses.

* * * * *